(12) United States Patent
Chung et al.

(10) Patent No.: US 7,794,130 B2
(45) Date of Patent: Sep. 14, 2010

(54) SEGMENTED LIGHT GUIDE

(75) Inventors: Muh Fong Chung, Penang (MY); Sian Tatt Lee, Penang (MY); Choon Guan Ko, Penang (MY); Fook Chuin Ng, Butterworth (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 189 days.

(21) Appl. No.: 12/140,746

(22) Filed: Jun. 17, 2008

(65) Prior Publication Data
US 2009/0310355 A1 Dec. 17, 2009

(51) Int. Cl.
*H04M 1/22* (2006.01)
(52) U.S. Cl. ............ 362/612; 362/24; 362/27; 362/88
(58) Field of Classification Search .......... 362/16, 362/24, 26, 27, 29, 85, 86, 88, 602, 612, 362/249.02, 249.04, 249.08, 249.05, 249.12, 362/249.13
See application file for complete search history.

(56) References Cited

U.S. PATENT DOCUMENTS

| 3,216,394 | A |   | 11/1965 | Blackwell |   |
|---|---|---|---|---|---|
| 4,349,705 | A | * | 9/1982 | Kuhfus | 379/361 |
| 5,949,346 | A | * | 9/1999 | Suzuki et al. | 340/815.45 |
| 6,022,117 | A |   | 2/2000 | Tenmyo et al. |   |
| 7,357,523 | B2 |   | 4/2008 | Kao et al. |   |
| 7,543,971 | B2 | * | 6/2009 | Lee et al. | 362/616 |
| 2006/0193147 | A1 |   | 8/2006 | Inoue |   |
| 2007/0127227 | A1 | * | 6/2007 | Osawa | 362/29 |

\* cited by examiner

*Primary Examiner*—John A Ward

(57) ABSTRACT

An exemplary embodiment of a segmented light guide includes a light channeling layer having a plurality of regions, with multiple slits in the light channeling layer dividing neighboring regions. The segmented light guide also includes at least one light source associated with the light channeling layer.

18 Claims, 3 Drawing Sheets

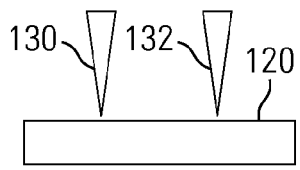
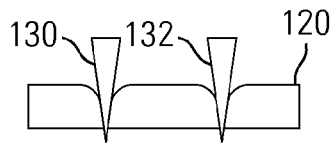
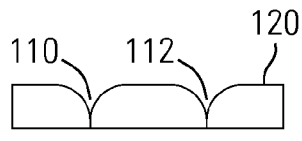
*FIG. 4A*  *FIG. 4B*  *FIG. 4C*
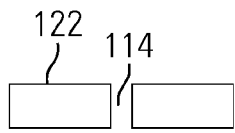
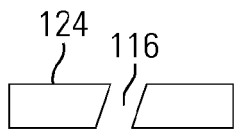
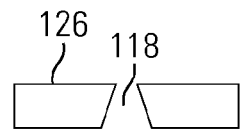
*FIG. 4D*  *FIG. 4E*  *FIG. 4F*
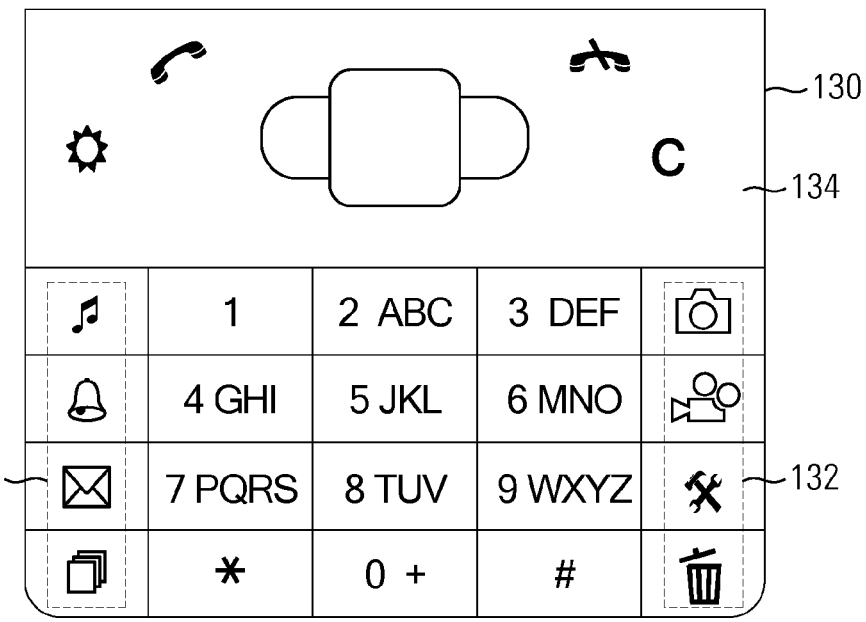
*FIG. 5*
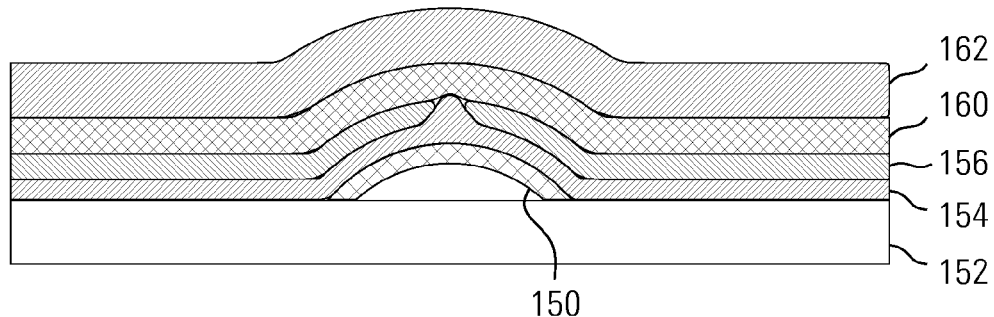
*FIG. 6*

SEGMENTED LIGHT GUIDE

BACKGROUND

Many electronic devices such as mobile phones have illuminated regions such as keypads. These regions are often illuminated by an electroluminescent (EL) panel that actively lights up across its surface when an electric current is passed through it. For example, a keypad having partially transparent graphics or icons may be placed above the EL panel so that the icons are illuminated by the EL panel underneath.

In devices having multiple regions to be independently illuminated, each region is typically illuminated by a separate EL panel. However, the EL panels have non-illuminating strips along the edges allowing for electrical connections. These non-illuminating strips prevent adjacent regions from being placed in close proximity. Furthermore, each EL panel is powered by a high voltage driver, so each independently illuminated region requires an additional high voltage driver, increasing the cost, complexity and size of an electronic device.

One solution to independently illuminating a multiple regions of an electronic device is the use of a light guide made of a sheet of a substantially transparent material, with one or more light sources illuminating the sheet. Regions to be independently illuminated are separated by a slit in the light guide. However, if the light guide is prevented from lying flat in the electronic device, bulges in the light guide near the slits can cause light to bleed from one region to the next.

BRIEF DESCRIPTION OF THE DRAWINGS

FIGS. 4A-4F are side views of exemplary multiple slit profiles in a segmented light guide.

FIG. 5 is a top view of an exemplary keypad that may be illuminated by various embodiments of a segmented light guide.

FIG. 6 is a cross-sectional view of an exemplary keypad and segmented light guide.

DESCRIPTION

The drawings and description, in general, disclose a segmented light guide and a portable electronic device using a segmented light guide. The exemplary segmented light guide comprises a thin film or sheet of a substantially transparent material, with one or more light sources illuminating the sheet. For example, light emitting diodes (LEDs) may be placed adjacent the sheet so that they direct light either into a surface or an edge of the sheet. The light fills the light guide and illuminates the face of the light guide and any display elements adjacent the light guide. For example, a keypad having partially transparent graphics or icons may be placed above the light guide so that the icons are illuminated by the light guide. The segmented light guide may be divided into multiple regions by forming multiple slits in the light guide between the regions. The slits may be continuous lines of two or more cuts into the sheet, running parallel or otherwise. The slits may also be a staggered line of short cuts that, taken together, form a line that optically dividing one region of the sheet from the next, allowing each region to be independently illuminated. The staggered line enables neighboring regions to remain physically connected in a single sheet, maintaining the tensile strength and integrity of the sheet. Neighboring regions may be further optically divided by depositing a coating against a surface of the sheet adjacent the slits. This is particularly advantageous when the sheet does not lie flat in a device such as a portable telephone, etc., for reasons such as light sources or keypad buttons placed against the sheet. The segmented light guide thus enables multiple closely spaced regions to be independently or simultaneously illuminated, even when it does not lie flat in a single plane in a device. The segmented light guide may be constructed simply and inexpensively using LED illumination or other such advantageous light sources.

Figure 1:
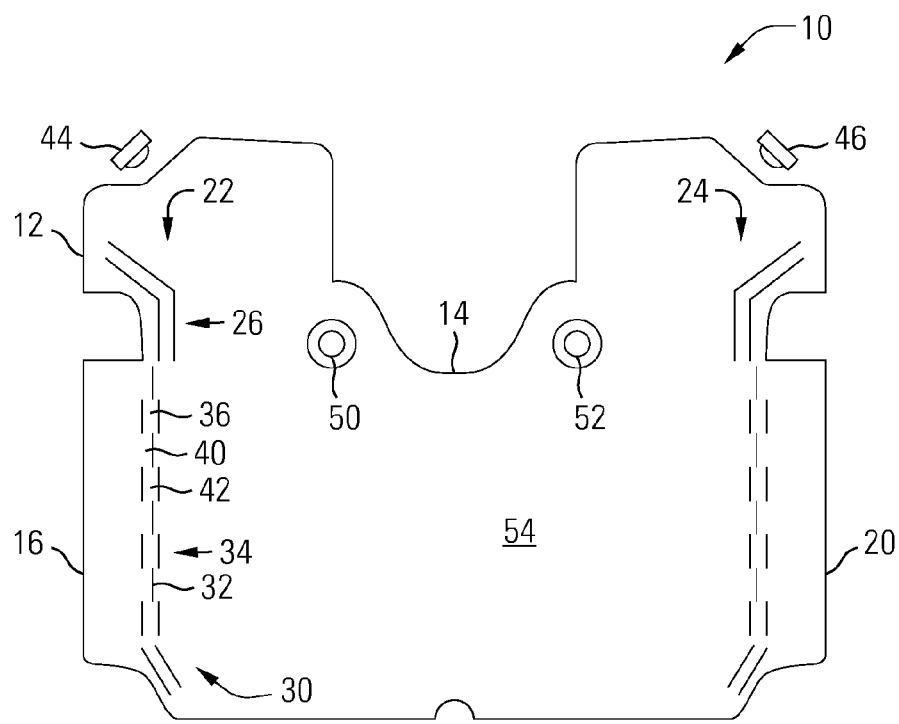
FIG. 1 is a top view of an exemplary segmented light guide having adjacent regions divided by multiple slits.

Referring now to FIG. 1, an exemplary segmented light guide 10 includes a light channeling layer 12 divided into multiple regions 14, 16 and 20 by groups of multiple slits 22 and 24. The light channeling layer 12 may be made of any suitable material through which light propagates, such as a thin film of polyurethane or other clear plastic sheet material. The multiple slits (e.g., 22) in the exemplary embodiment are cuts all the way through the light channeling layer 12 from top to bottom, although the slits may alternatively comprise any partial cut, scrape, or groove, etc., that can be made in the light channeling layer 12 to impede light from propagating past the slit from one segment (e.g., 14) to the next (e.g., 16).

Multiple slits dividing neighboring regions (e.g., 14 and 16) may comprise continuous lines (e.g., 26) of cuts in the light channeling layer 12 that run in parallel or non-parallel paths. A multiple slit boundary between neighboring regions (e.g., 14 and 16) may also comprise a staggered line 30 of various slit patterns such as alternating short single slits 32 with short double slits 34. These alternating staggered patterns may be used to form optical baffles 36, 40, and 42 that physically connect neighboring regions (e.g., 14 and 16) but that require that light change direction multiple times to propagate from one region (e.g., 16) to another (e.g., 14). The staggered line 30 enables neighboring regions (e.g., 14 and 16) to remain physically connected in a single sheet 12, maintaining the tensile strength and integrity of the sheet. Note that the multiple slits may include as many slits extending side by side as desired, such as in double or triple lines, etc.

The slits (e.g., 22 and 24) may be formed by any suitable method, for example, using die cut tooling in a press to stamp the slits into the light channeling layer 12, or using a laser to make the cuts, etc. The slits (e.g., 22 and 24) may be made as simple narrow cuts, taking no care to widen the slit beyond the width of the cutting mechanism. Alternatively, the slits may be made wider than the cutting mechanism if desired to further separate adjacent segments (e.g., 16, 14 and 20). The slits 22 and 24 may be formed in straight lines, curves, or any desired geometry.

Light may be introduced into the light channeling layer 12 in any suitable manner, such as by mounting LEDs 44, 46, 50 and 52 underneath a surface or adjacent edges of the light channeling layer 12 to illuminate some or all of the segmented light guide 10. Microdots or any other techniques whether currently known or developed in the future may be used within or adjacent the light channeling layer 12 to scatter light upward to illuminate the face 54 of the segmented light guide 10. For example, the polyurethane sheet forming the light channeling layer 12 may be embossed with microdots that scatter light upward. The different segments 14, 16 and 20 can be independently illuminated by turning on different LEDs.

The use of a light guide that is segmented by slits and illuminated by a simple and inexpensive light source such as LEDs enables segments to be placed immediately adjacent one another. The permits the independent illumination of closely positioned regions of a device such as a keypad.

Figure 2:
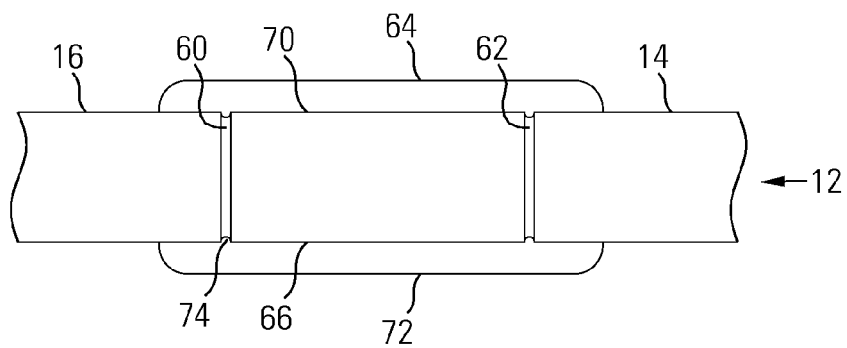
FIG. 2 is a cross-sectional side view of an exemplary segmented light guide having multiple slits between adjacent regions and a coating deposited against the slits.

Referring now to FIG. 2, a cross-sectional side view of a light channeling layer 12 is illustrated having multiple slits 60 and 62 separating the regions 16 and 14. (Note that the features of the drawings are not drawn to scale.) In one embodiment, the light channeling layer 12 has a coating 64 and 66 deposited thereon, further optically isolating the regions 16 and 14 from one another. The coating 64 and 66 may be deposited on one or both surfaces 70 and 72, and may overlap the slits 60 and 62 if desired to prevent light from bleeding from one region 16 to another 14. The coating 64 and 66 may comprise any suitable material desired, such as an ink that is printed onto the light channeling layer 12 or a toner powder that is electrostatically applied and fused or baked onto the light channeling layer 12, etc. The coating 64 and 66 may have any thickness desired and may be applied in a single layer or multiple layers. The coating 64 and 66 may have any color desired, such as black. In one embodiment, the coating 64 and 66 is substantially opaque and is flexible and/or elastic so that it remains adhered to the light channeling layer 12 despite flexing or bulging due to light sources or other structures adjacent the light channeling layer 12. The coating 64 and 66 may remain on the surface of the light channeling layer 12, or may extend somewhat into the slit 60 (see 74), or may penetrate entirely into the slit 60 to coat the edges of the slit 60 as desired.

Figure 3:
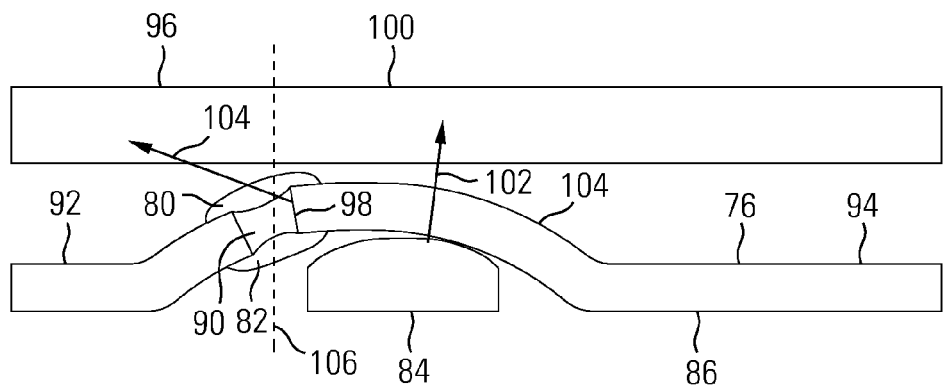
FIG. 3 is a cross-sectional side view of an exemplary segmented light guide with coating illustrating a bulge in the light guide caused by a light source underneath.

Turning now to FIG. 3, a cross-sectional side view of a light channeling layer 76 having a coating 80 and 82 will be described. In this embodiment, the light channeling layer 76 is distended out of a flat plane by a light source 84, such as an LED, placed adjacent a lower surface 86 of the light channeling layer 76. A slit 90 is made in the light channeling layer 76 to optically isolate two regions 92 and 94 of the light channeling layer 76 in order to independently illuminate two areas 96 and 100 of a device, such as two areas of a keypad in a portable electronic device. The light source 84 is placed in order to illuminate 102 an intended area 100 of the device. However, the dome or bulge 104 could cause light to bleed from one region 94 to another 92 across the boundary 106, such as through an edge 98 of the slit 90, inadvertently illuminating 104 an area 96 of the device intended to be dark at the time. The coating 80 and 82 prevents this inadvertent illumination 104, despite the bulge 104 caused by the light source 84.

Referring now to FIGS. 4A-4F, slits (e.g., 110, 112, 114, 116 and 118) may be cut or formed in a light channeling sheet (e.g., 120, 122, 124 and 126) with any desired profile. For example, FIGS. 4A-4C illustrate the cutting of multiple slits 110 and 112 in a relatively elastic material such as a polyurethane sheet 120. This may be cut, for example, using die cut tooling 130 and 132. The elastic sheet 120 then relaxes, bringing the adjacent sides of each slit substantially together to leave a very narrow double slit 110 and 112 that divides two regions without requiring wide separating strips. In other embodiments, for example those using more rigid light channeling sheet materials, a slit may be formed with a straight cut 114 in which the sides are perpendicular to the top surface of the sheet 122 as in FIG. 4D, or in other cuts as desired to minimize light propagation from one segment to another. For example, as illustrated in FIG. 4E, the cut 116 may be made at a non-perpendicular angle to the surface of the sheet 124, which may refract light at angles in the slit 116 that help prevent light from propagating across the slit 116 between neighboring segments of the sheet 124. Slits (e.g., 118) may also be made without parallel walls, as illustrated in FIG. 4F, or with any desired profile that best prevents light from propagating across the slit between neighboring segments according to physical constraints of the light guide, such as thickness of the light channeling sheet, width of the slit, etc. Again, providing multiple slits and coating the sheet adjacent the slits further isolates neighboring regions of a light channeling sheet, particularly when the sheet will not lie flat in a device.

Referring now to FIG. 5, an exemplary keypad 130 will be described that may advantageously be illuminated by the segmented light guide described above. Note that the keypad and functions illustrated in FIG. 5 are merely examples and that the segmented light guide may be used to illuminate any device or object, and is not limited to use with a keypad or any particular device. The keypad 130 may have various functions that can be logically grouped and used independently, such as mobile phone functions, camera functions, or organizer functions. Segments of the keypad 130 containing these grouped functions may be independently illuminated by a segmented light guide having multiple slits and coatings. For example, a region 132 having camera buttons may be illuminated for use while leaving a region 134 containing mobile phone functions and a region 136 containing organizer functions dark. This saves power and may simplify use of the keypad 130 by reducing the number of illuminated buttons to be considered while performing a specific task, such as capturing an image using buttons in the camera segment 132.

The keypad 130 of FIG. 5 may be placed over a segmented light guides (e.g., 10) to independently illuminate regions of the keypad 130. The keypad (e.g., 130) may be placed over or adjacent a segmented light guide, or a keypad 148 can be manufactured with an integral segmented light guide as illustrated in the cross-sectional view of FIG. 6. The keypad layers of the device may comprise any suitable means now known or that may be developed in the future, and the integral segmented light guide in a keypad is not limited to the particular exemplary layers and architecture illustrated in FIG. 6. For example, buttons (e.g., 150) may be formed on a substrate 152 in any manner desired, such as a blister type button 150 or using hinged plastic buttons (not shown). A plunger layer 154 and mylar sheet 156 or other structures may be used as desired to enable the functionality of the keypad. A light channeling layer 160 of a segmented light guide may be formed over the functional keypad layers 150, 154 and 156, followed by a keypad membrane 162 having printed graphics to be illuminated. Again, printing or otherwise depositing a coating adjacent multiple slits (not shown in FIG. 6) separating dsneighboring regions prevents light from bleeding from one region to another.

Figure 7:
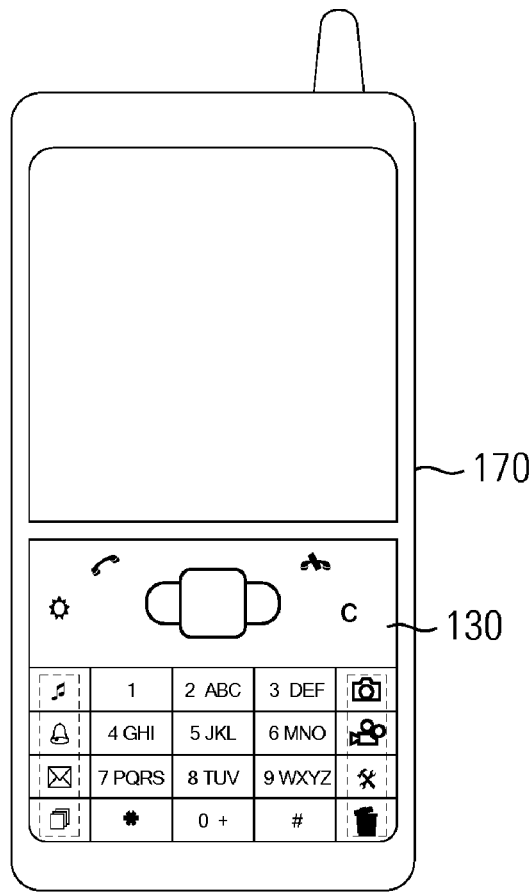
FIG. 7 is an exemplary portable electronic device having a segmented light guide.

A portable electronic device 170 that may employ a segmented light guide to illuminate a keypad 130 is illustrated in FIG. 7. The portable electronic device 170 may comprise a mobile phone or any other device, such as a personal digital assistant (PDA), global positioning system (GPS) device, portable computer, a camera, etc. As described above, the segmented light guide used to illuminate the keypad 130 in the portable electronic device 170 includes a light channeling layer having multiple slits dividing one region from the next and may include a coating adjacent the slits to further absorb and block light.

Figure 8:
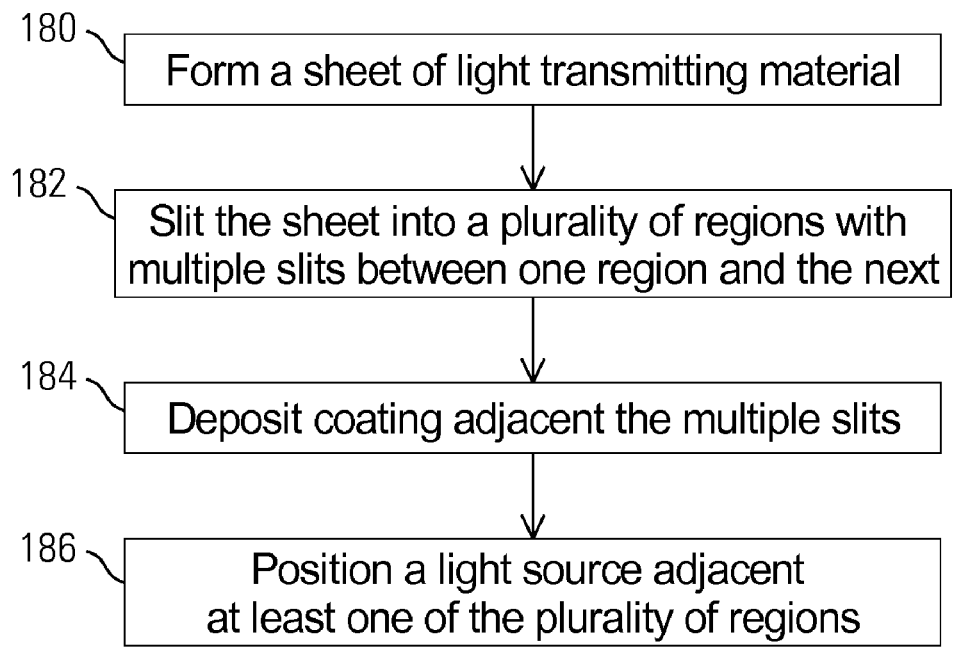
FIG. 8 is a flowchart of an exemplary operation for making a segmented light guide with multiple slits and a coating.

An exemplary operation for forming a sheet of light transmitting material is illustrated in the flowchart of FIG. 8. A sheet of light transmitting material is formed 180, such as a sheet of polyurethane. Any other suitable light transmitting material may be used to meet the requirements of the system to be illuminated. For example, a polyurethane sheet has the advantage of being soft, easily cut and elastic to withstand the rigors of the cutting operation and being formed to flexible parts such as a keypad 148 described above with respect to FIG. 6. The light transmitting material may be slit 182 into a plurality of segments with multiple slits between one region and the next as described above, for example using die cut tooling, a laser cutter, or any other suitable cutting method. A coating may be deposited 184 on the light transmitting material adjacent the multiple slits to further absorb and block light. Light sources are positioned 186 adjacent edges of the sheet to illuminate the segments, or are alternatively associated with the sheet in any suitable manner. Microdots or other light scattering mechanisms and reflective surfaces, etc. may also be formed on the sheet as desired.

The segmented light guide with multiple slits and coatings disclosed herein provides a simple, inexpensive and effective way to independently illuminate closely neighboring regions of a keypad or other device, without requiring multiple complex power sources. The segmented light guide optically isolates neighboring regions effectively even when distended out of a flat plane. The segmented light guide with multiple slits also maintains the tensile strength and integrity of the overall sheet.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A segmented light guide comprising:
   a light channeling layer having a plurality of regions;
   a plurality of slits in the light channeling layer dividing a first region from a second region, the first and second regions comprising neighboring regions in the light channeling layer;
   a coating deposited on a surface of the light channeling layer adjacent the plurality of slits; and
   at least one light source associated with said light channeling layer.

2. The segmented light guide of claim 1, said at least one light source being located adjacent a surface of said light channeling layer and causing at least one distension in the light channeling layer so that the light channeling layer does not lie in a single flat plane.

3. The segmented light guide of claim 1, wherein the plurality of slits comprises a line of alternating slits between the first and second regions, the line of alternating slits comprising a series of single slits and double slits in succession.

4. The segmented light guide of claim 3, wherein the first region and the second region are at least partially connected by a plurality of paths through the line of alternating slits.

5. The segmented light guide of claim 3, wherein the line of alternating slits forms a plurality of optical baffles between the first and second regions in the light channeling layer.

6. The segmented light guide of claim 1, wherein the coating is printed onto the surface of the light channeling layer.

7. A segmented light guide comprising:
   a light channeling layer having a plurality of regions;
   at least one slit in the light channeling layer dividing one of said plurality of regions from a neighboring one of said plurality of regions;
   a coating deposited on said light channeling layer adjacent said at least one slit; and
   at least one light source associated with said light channeling layer.

8. The segmented light guide of claim 7, wherein the coating comprises a flexible material adhered to a surface of the light channeling layer.

9. The segmented light guide of claim 7, wherein the coating comprises a substantially opaque material.

10. The segmented light guide of claim 7, wherein the coating overlaps the at least one slit to contact portions of the light channeling layer on either side of the at least one slit.

11. A portable electronic device, comprising:
    a first area to be illuminated;
    a second area to be illuminated;
    a segmented light guide having a first region adjacent said first area and a second region adjacent said second area, said segmented light guide comprising a substantially transparent sheet having a plurality of slits between said first region and said second region and;
    a coating deposited on said segmented light guide adjacent the plurality of slits.

12. The portable electronic device of claim 11, said segmented light guide further comprising a first light source associated with said first region and a second light source associated with said second region, whereby said first area and said second area may be independently illuminated by said first light source and said second light source.

13. The portable electronic device of claim 11, wherein the coating is deposited on an upper surface and a lower surface of the segmented light guide adjacent the plurality of slits.

14. The portable electronic device of claim 11, wherein the coating comprises a flexible material that remains substantially attached to the light channeling layer when the light channeling layer does not lie flat in a single plane in the portable electronic device.

15. The portable electronic device of claim 11, wherein the coating is substantially opaque.

16. The portable electronic device of claim 11, wherein said plurality of slits between the first region and the second region form a plurality of optical baffles between the first region and the second region.

17. The portable electronic device of claim 16, wherein the first region and the second region are at least partially connected by a path in the light channeling layer through the plurality of optical baffles.

18. The portable electronic device of claim 11, wherein said plurality of slits comprise at least two slits that lie alongside each other along at least a portion of a boundary between the first and the second regions.

* * * * *